United States Patent
Kim et al.

(10) Patent No.: US 8,057,954 B2
(45) Date of Patent: Nov. 15, 2011

(54) MEMBRANE-ELECTRODE ASSEMBLY INCLUDING GUARD GASKET

(75) Inventors: Hyoung-Juhn Kim, Suwon-si (KR); Jeung Woo Lee, Busanjin-gu (KR); Jong Hyung Jang, Yongin-si (KR); Eun Ae Cho, Seoul (KR); Sung Pil Yoon, Seongnam-si (KR); Suk-woo Nam, Seoul (KR); In Hwan Oh, Seoul (KR); Seong Ahn Hong, Seoul (KR); Tae Hoon Lim, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 234 days.

(21) Appl. No.: 12/345,311

(22) Filed: Dec. 29, 2008

(65) Prior Publication Data

US 2010/0075202 A1    Mar. 25, 2010

(30) Foreign Application Priority Data

Sep. 23, 2008    (KR) .................. 10-2008-0093297

(51) Int. Cl.
*H01M 2/14* (2006.01)
*H01M 2/08* (2006.01)
*H01M 8/24* (2006.01)

(52) U.S. Cl. ......... 429/508; 429/463; 429/509; 429/469

(58) Field of Classification Search .......... 429/452, 429/479–483, 492–493, 507–510, 512, 516, 429/535, 463, 469; 525/50, 535

See application file for complete search history.

(56) References Cited

U.S. PATENT DOCUMENTS

2006/0030683 A1* 2/2006 Moore et al. .................. 525/535
2010/0279197 A1* 11/2010 Kim et al. .................... 429/483

FOREIGN PATENT DOCUMENTS

| JP | 2005-302526 | 10/2005 |
|---|---|---|
| JP | 2006-185613 | 7/2006 |
| JP | 2007-035459 | 2/2007 |

(Continued)

OTHER PUBLICATIONS

Krishnan et al., "Synthesis and characterization of sulfonated poly(ether sulfone) copolymer membranes for fuel cell applications," *Journal of Power Sources* (2006) 158: 1246-1250.

Kim et al., "Sulfonated poly(ether sulfone) for universal polymer electrolyte fuel cell operations," *Journal of Power Sources* (2006) 160: 353-358.

(Continued)

*Primary Examiner* — Barbara Gilliam
*Assistant Examiner* — Claire L Roe
(74) *Attorney, Agent, or Firm* — Merchant & Gould P.C.

(57) ABSTRACT

Disclosed is a membrane-electrode assembly (MEA) that prevents an electrolyte membrane from being damaged upon the fabrication of a single cell or a stack of fuel cells. The MEA further includes a guard gasket interposed between conventional gaskets, wherein the guard gasket has a thickness corresponding to 70%-95% of the thickness of the electrolyte membrane. The MEA ensures mechanical protection of the electrolyte membrane, and thus prevents the electrolyte membrane from being damaged by an excessive binding pressure upon the fabrication of a single cell or a stack of fuel cells. Furthermore, the contact resistance between the electrolyte membrane and the catalyst layer and the contact resistance between the gas diffusion layer and the catalyst layer can be minimized, thereby improving the quality of a fuel cell.

4 Claims, 4 Drawing Sheets

FOREIGN PATENT DOCUMENTS

| | | |
|---|---|---|
| JP | 2007-048524 | 2/2007 |
| JP | 2007-095669 | 4/2007 |
| JP | 2008-103247 | 5/2008 |
| KR | 10-0590041 | 10/2004 |

OTHER PUBLICATIONS

Xiao et al., "High-temperature polybenzimidazole fuel cell membranes via a sol-gel process," *Chem. Mater.* (2005) 17: 5328-5333.

* cited by examiner a)

b)

a)  b)

MEMBRANE-ELECTRODE ASSEMBLY INCLUDING GUARD GASKET

CROSS-REFERENCE TO RELATED APPLICATION

This application claims the benefit of Serial No. 10-2008-0093297, filed Sep. 23, 2008 in South Korea and which application(s) are incorporated herein by reference. A claim of priority to all, to the extent appropriate is made.

BACKGROUND

1. Technical Field

Example embodiments of the present invention relates to a membrane-electrode assembly (MEA) including a guard gasket.

2. Description of the Related Art

A fuel cell is a kind of power generation system that converts chemical energy of fuel directly into electric energy. Since the electric energy is generated directly from a fuel cell without requiring an additional step such as combustion, the fuel cell has advantages in that it produces little environmental contaminants and it provides high heat efficiency. Fuel cells are classified into polymer electrolyte membrane fuel cells (PEMFC), phosphoric acid fuel cells (PAFC), molten carbonate fuel cells (MCFC) and solid oxide fuel cells (SOFC) depending on the kinds of the electrolytes used therein.

A fuel cell comprises a stack formed by stacking a plurality of single cells, wherein each single cell comprises an MEA including an electrolyte membrane, a catalyst layer and a gas diffusion layer, and sandwiched between seperators. Additionally, surface grooving on the seperators allows supply and discharge of hydrogen on one side, and supply and discharge of oxygen gas in air on the other side.

The fuel cell causes fuel such as hydrogen or methanol to react electrochemically with oxygen to convert the chemical energy of the fuel directly into electric energy. Unlike conventional thermal power generation systems, fuel cells undergo no Carnot cycles so that they show high power generation efficiency, emit little contaminants such as $NO_x$ and $SO_x$, and generate no noises during their operation. Therefore, fuel cells have been regarded as the most prominent clean energy source for the next generation. Fuel cells are classified into PEMFC, PAFC, MCFC, SOFC, etc., depending on the kinds of the electrolytes used therein. Among those, PEMFC have a lower driving temperature as compared to other kinds of fuel cells while showing excellent power generation efficiency and realizing compact structures. Thus, it is believed that PEMFC are useful as power sources for electric vehicles, compact power generation systems, for example, for household applications, mobile or emergency power sources, military power sources, etc.

In general, a PEMFC has a penta-layer structure of collector/anode/polymer electrolyte membrane (PEM)/cathode/collector. Fuel such as hydrogen or methanol is supplied to the anode, while air or oxygen is supplied to the cathode. At the anode, the fuel is oxidized to generate protons and electrons. The protons move toward the cathode through the electrolyte membrane, while the electrons move toward the cathode through wires and loads forming an external circuit. The protons and electrons react with oxygen at the cathode to produce water, which, in turn, is discharged to the exterior of the fuel cell.

Both electrodes of the PEMFC are obtained by applying an ink comprising a catalyst for activating the redox reaction, a polymer electrolyte and a solvent onto carbon paper or carbon cloth to form a catalyst layer. An example of the catalyst that is currently used includes a platinum-based catalyst which is comprised of platinum or platinum/ruthenium alloy having high catalytic activity and supported on a carrier formed of carbon particles.

Particular examples of the PEM include fluorosulfonate ionomer membranes such as Nafion (available from DuPont Co.), Flemion (available from Asahi Glass Co., Ltd.), Asiplex (available from Asahi Chemical Co. Ltd.) and Dow XUS (available from Dow Chemical Co.); and inorganic acid-doped polybenzimidazole (PBI)-based PEMs.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The inventors of the present invention have recognized that when a polybenzimidazole (PBI)-based electrolyte membrane is doped with a high amount of inorganic acid, or when a sulfonate-containing electrolyte membrane is excessively swollen with water, the electrolyte membrane shows decreased mechanical strength, resulting in significant limitation in the application of the electrolyte membrane to a membrane-electrode assembly (MEA) for a polymer electrolyte membrane fuel cell (PEMFC).

In one aspect, the present invention provides an MEA comprising an electrolyte membrane 1, catalyst layers 2a, 2b formed on both surfaces of the electrolyte membrane, gas diffusion layers 3a, 3b formed on the catalyst layers, gaskets 4a, 4b that are in contact with the lateral surfaces of the catalyst layers and the gas diffusion layers, and further comprising a guard gasket 5 interposed between the gaskets 4a, 4b and having a thickness corresponding to 70%-95% of the thickness of the electrolyte membrane.

The MEA comprising a guard gasket having a thickness corresponding to 70%-95% of the thickness of the electrolyte membrane according to one embodiment of the present invention ensures mechanical protection of the electrolyte membrane. Therefore, it is possible to prevent the electrolyte membrane from being damaged by an excessive pressure upon the fabrication of a single cell or a stack of fuel cells. Furthermore, the contact resistance between the electrolyte membrane and the catalyst layer and the contact resistance between the gas diffusion layer and the catalyst layer can be minimized, thereby improving the quality of a fuel cell.

BRIEF DESCRIPTION OF THE DRAWINGS

The present invention will now be described in detail with reference to certain example embodiments thereof illustrated in the accompanying drawings which are given hereinbelow by way of illustration only, and thus are not limitative of the present invention, and wherein.

Figure 1:
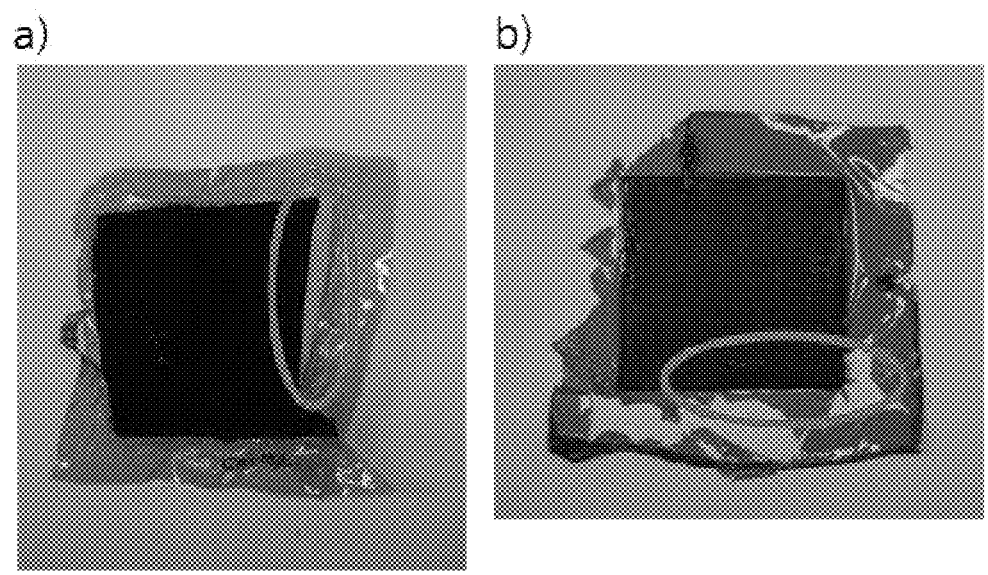
FIG. 1a is a photographic view showing the membrane-electrode assembly (MEA) using a sulfonate-containing polymer electrolyte membrane (PEM) after a fuel cell comprising the MEA is driven for a long time (as taken in the absence of gaskets)
FIG. 1b is a photographic view showing the MEA using polybenzimidazole PBI)-based PEM doped with 2,000% of phosphoric acid after a fuel cell comprising the MEA is driven for a long time (as taken in the absence of gaskets)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations and shapes will be determined in part by the particular intended application and use environment.

DETAILED DESCRIPTION OF THE INVENTION

Hereinafter, reference will now be made in detail to various embodiments of the present invention, examples of which are illustrated in the accompanying drawings and described below. While the invention will be described in conjunction with example embodiments, it will be understood that the present description is not intended to limit the invention to those example embodiments. On the contrary, the invention is intended to cover not only the example embodiments, but also various alternatives, modifications, equivalents and other embodiments, which may be included within the spirit and scope of the invention as defined in the appended claims.

The membrane-electrode assembly (MEA) according to one embodiment of the present invention prevents the electrolyte membrane from being damaged upon the fabrication of a single cell or a stack of fuel cells. To accomplish this, the MEA comprises an electrolyte membrane 1, catalyst layers 2a, 2b formed on both surfaces of the electrolyte membrane, gas diffusion layers 3a, 3b formed on the catalyst layers, and gaskets 4a, 4b that are in contact with the lateral surfaces of the catalyst layers and the gas diffusion layers, and further comprises a guard gasket 5 interposed between the gaskets 4a, 4b and having a thickness corresponding to 70%-95% of the thickness of the electrolyte membrane.

The electrolyte membrane according to one embodiment of the present invention includes a sulfonate-containing solid electrolyte membrane or inorganic acid-doped polybenzimidazole (PBI)-based electrolyte membrane. In the case of a sulfonate-containing solid electrolyte membrane, the solid electrolyte membrane should maintain a humidity of 50% or more to allow protons to pass through the solid electrolyte membrane smoothly. Such movement of protons is accompanied by the movement of electrons, thereby generating electricity. However, the electrolyte membrane shows decreased mechanical strength, when the sulfonate-containing electrolyte membrane is excessively swollen with water, or when the PBI-based electrolyte membrane is doped with a high amount of inorganic acid (particularly, when the sulfonate-containing electrolyte membrane has a humidity of 50% or more, or when the PBI-based electrolyte membrane is doped with 300% or more of inorganic acid.) FIGS. 1a and 1b are photographic views showing the MEAs in which the edges of the electrolyte membrane are disrupted after the long-term driving of the fuel cells using the same (as taken in the absence of gaskets.)

To solve the problem related to the disruption of the electrolyte membrane, the MEA according to one embodiment of the present invention further comprises a guard gasket for protecting the electrolyte membrane, wherein the guard gasket is inserted between the previously existing gaskets upon the assemblage of a fuel cell.

Figure 2:
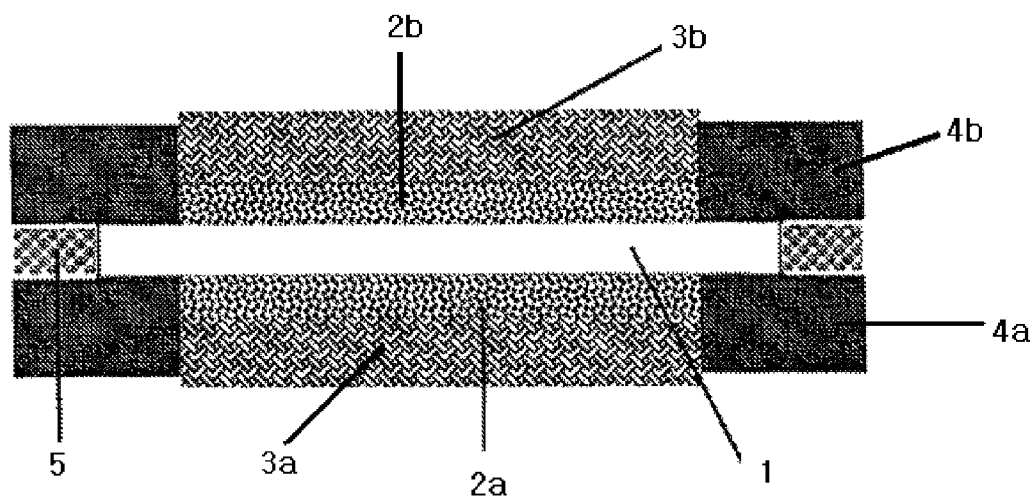
FIG. 2a and FIG. 2b are a schematic sectional view and a top view of the MEA according to one embodiment of the present invention, respectively.
Figure 2:
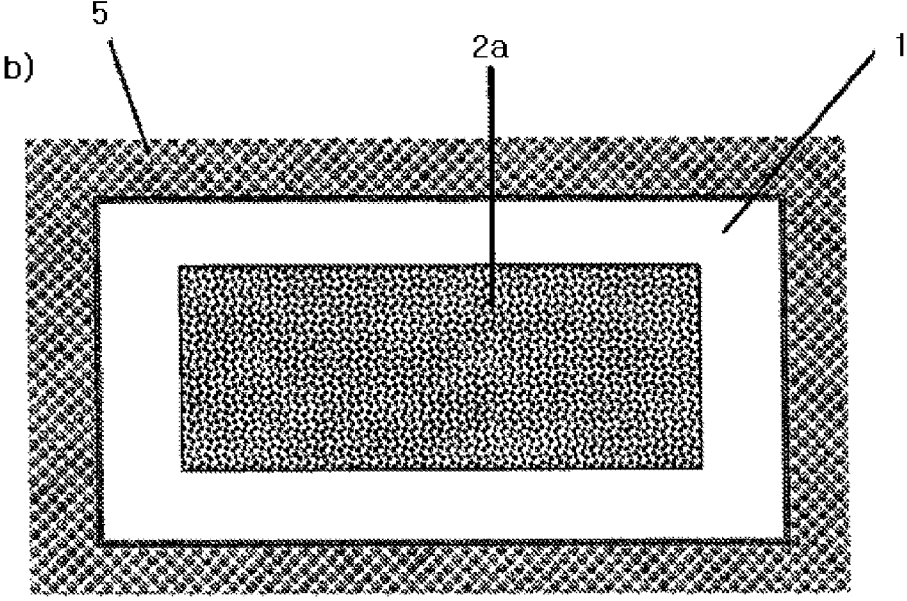

FIG. 2a and FIG. 2b are a schematic sectional view and a top view of the MEA according to one embodiment of the present invention, respectively. FIG. 2b shows the MEA before the gaskets and gas diffusion layers are attached thereto.

In one embodiment of the present invention, the MEA comprises an electrolyte membrane 1, catalyst layers 2a, 2b formed on both surfaces of the electrolyte membrane, gas diffusion layers 3a, 3b formed on the catalyst layers, and gaskets 4a, 4b that are in contact with the lateral surfaces of the catalyst layers and the gas diffusion layers, and further comprises a guard gasket 5 interposed between the gaskets 4a, 4b and having a thickness corresponding to 70%-95% of the thickness of the electrolyte membrane. The guard gasket may have a thickness corresponding to 80%-90% of the thickness of the electrolyte membrane.

When the guard gasket has a thickness corresponding to less than 70% of the thickness of the electrolyte membrane, it cannot function well as a guard member. On the other hand, when the guard gasket has a thickness corresponding to greater than 95% of the thickness of the electrolyte membrane, it causes an increase in the contact resistance between the electrolyte membrane and the catalyst layer and the contact resistance between the gas diffusion layer and the catalyst layer, resulting in degradation of the quality of the fuel cell.

The guard gasket may have a thickness controlled depending on the kind and hydration degree of the sulfonate-containing polymer forming the electrolyte membrane, and a doping degree of a PBI-based polymer with an inorganic acid.

In the MEA according to one embodiment of the present invention, the guard gasket may comprise an acid-resistant polymer, such as polytetrafluoroethylene (PTFE) or polyimide.

Particularly, PTFE is a hydrophobic polymer having no permeability to water and methanol, and maintains a physicochemically stable state by virtue of the strong binding force of fluorine and carbon atoms, thereby realizing excellent durability. Additionally, PTFE is resistant against acids so that it is suitable for forming a part of a polymer electrolyte membrane fuel cell (PEMFC) in which the environment is strongly acidic (pH 2-3).

Figure 3:
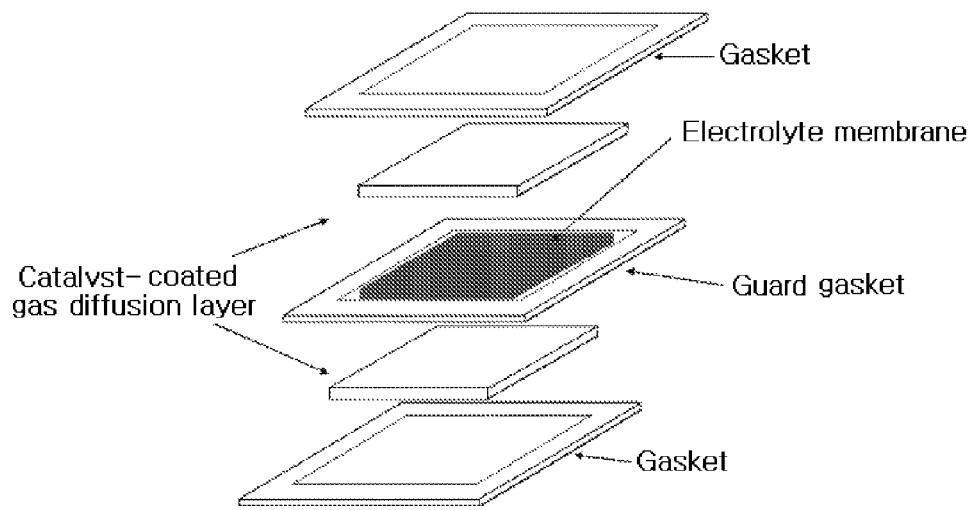
FIG. 3 is a schematic view showing the constitution of the MEA according to one embodiment of the present invention.

The MEA according to one embodiment of the present invention may be obtained by the method comprising: providing a coating composition for forming a catalyst; coating electrode substrates (gas diffusion layers) with the coating composition to provide electrodes; interposing a polymer electrolyte membrane (PEM) between the electrodes and joining them into an assembly; and placing a guard gasket having a smaller thickness than the PEM between gaskets, before installing the gaskets with the guard gasket interposed therebetween in place. FIG. 3 is a schematic view showing the constitution of the MEA according to one embodiment of the present invention.

EXAMPLES

The following examples illustrate the membrane-electrode assemblies (MEAs) according to preferred embodiments of the present invention and are not intended to limit the same.

Example 1 and Comparative Example 1

An MEA (Example 1) was obtained by using a sulfonated poly(ethersulfone) electrolyte membrane with a thickness of 40 μm (see *Journal of Power Sources* 158 (2006) 1246-1250; and *Journal of Power Sources* 160 (2006) 353-358), and further using a polytetrafluoroethylene (PTFE) guard gasket with a thickness of 35 μm in a conventional manner for fabricating an MEA.

Another MEA (Comparative Example 1) was obtained in the same manner as Example 1 except that no guard gasket was used.

Example 2 and Comparative Example 2

An MEA (Example 2) was obtained by using a polybenzimidazole (PBI)-based polymer electrolyte membrane (PEM) doped with 2,000% of phosphoric acid and having a thickness of 400 μm, and further using a PTFE guard gasket with a thickness of 350 μm in a conventional manner for fabricating an MEA. In Example 2, the phosphoric acid-doped PBI-based PEM was obtained by mixing 3,3'-diaminobenzidine and isophthalic acid with polyphosphoric acid and carrying out a reaction at 200° C. (see *Chem. Mater.* 2005, 17, 5328-5333.)

Another MEA (Comparative Example 2) was obtained in the same manner as Example 2 except that no guard gasket was used.

TEST EXAMPLES

Test Example 1

The effect of the thickness of a guard gasket upon the quality of an electrolyte membrane was determined. As can be seen from the impedance spectrum of the membrane-electrode assembly (MEA) taken as a function of the thickness of the guard gasket, ohmic resistance markedly increases when the thickness of the guard gasket exceeds 95% of the thickness of the electrolyte membrane.

The following Table 1 shows the ohmic resistance in the MEA using the polybenzimidazole (PBI)-based polymer electrolyte membrane (PEM) doped with 2,000% of phosphoric acid as a function of the thickness of the guard gasket. The following Table 2 shows the ohmic resistance in the MEA using the sulfonated poly(ethersulfone) electrolyte membrane as a function of the thickness of the guard gasket.

TABLE 1

| | Thickness ratio (guard gasket/membrane) | | |
|---|---|---|---|
| | <70% | 70%-95% | >95% |
| Ohmic resistance (Ωcm²) | 0.071 | 0.070 | 0.32 |

TABLE 2

| | Thickness ratio (guard gasket/membrane) | | |
|---|---|---|---|
| | <70% | 70%-95% | >95% |
| Ohmic resistance (Ωcm²) | 0.08 | 0.09 | 0.21 |

Test Example 2

Figure 4:
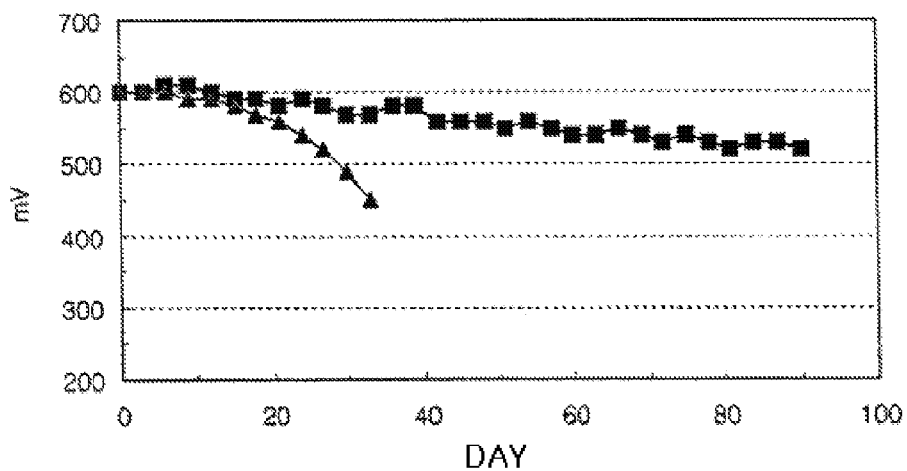
FIG. 4 is a graph showing the long-term driving quality of the fuel cells obtained by using the MEAs according to Example 1 and Comparative Example 1, wherein the curve represented by square symbols (■) corresponds to the fuel cell using the MEA according to Example 1 and the curve represented by triangle symbols (▲) corresponds to the fuel cell using the MEA according to Comparative Example 1.

Fuel cells were fabricated by using the MEAs obtained from Example 1 and Comparative Example 1, and the fuel cells were driven for a long period of time. The driving condition was as follows: ambient pressure; hydrogen/air operation; 65° C.; relative humidity 100%; and a constant current condition of 900 mA/cm². The results are shown in FIG. 4. In FIG. 4, the curve represented by square symbols (■) corresponds to the fuel cell using the MEA according to Example 1 and the curve represented by triangle symbols (▲) corresponds to the fuel cell using the MEA according to Comparative Example 1.

As can be seen from FIG. 4, the fuel cell using the MEA according to Example 1 (i.e., MEA including a guard gasket) maintains excellent quality for a long period of time.

Test Example 3

Figure 5:
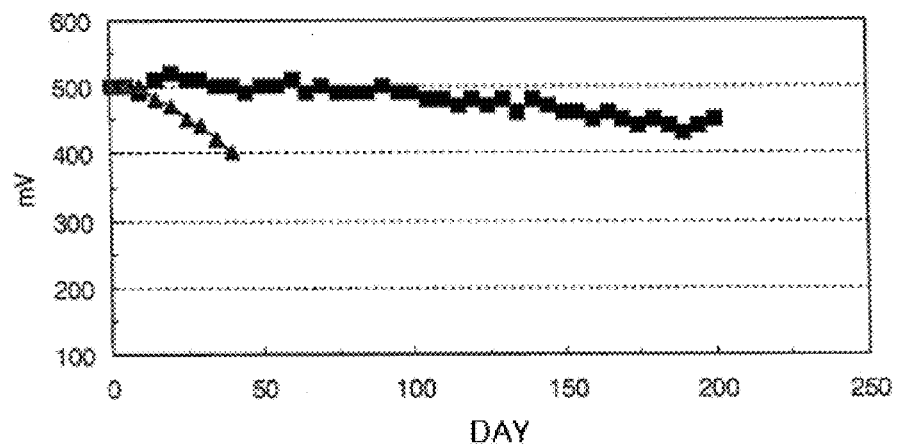
FIG. 5 is a graph showing the long-term driving quality of the fuel cells obtained by using the MEAs according to Example 2 and Comparative Example 2, wherein the curve represented by square symbols (■) corresponds to the fuel cell using the MEA according to Example 2 and the curve represented by triangle symbols (▲) corresponds to the fuel cell using the MEA according to Comparative Example 2.

Fuel cells were fabricated by using the MEAs obtained from Example 2 and Comparative Example 2, and the fuel cells were driven for a long period of time. The driving condition was as follows: ambient pressure; hydrogen/air operation; 150° C.; non-humidified condition; and a constant current condition of 450 mA/cm². The results are shown in FIG. 5. In FIG. 5, the curve represented by square symbols (■) corresponds to the fuel cell using the MEA according to Example 2 and the curve represented by triangle symbols (▲) corresponds to the fuel cell using the MEA according to Comparative Example 2.

As can be seen from FIG. 5, the fuel cell using the MEA according to Example 2 (i.e., MEA including a guard gasket) maintains excellent quality for a long period of time.

Figure 6:
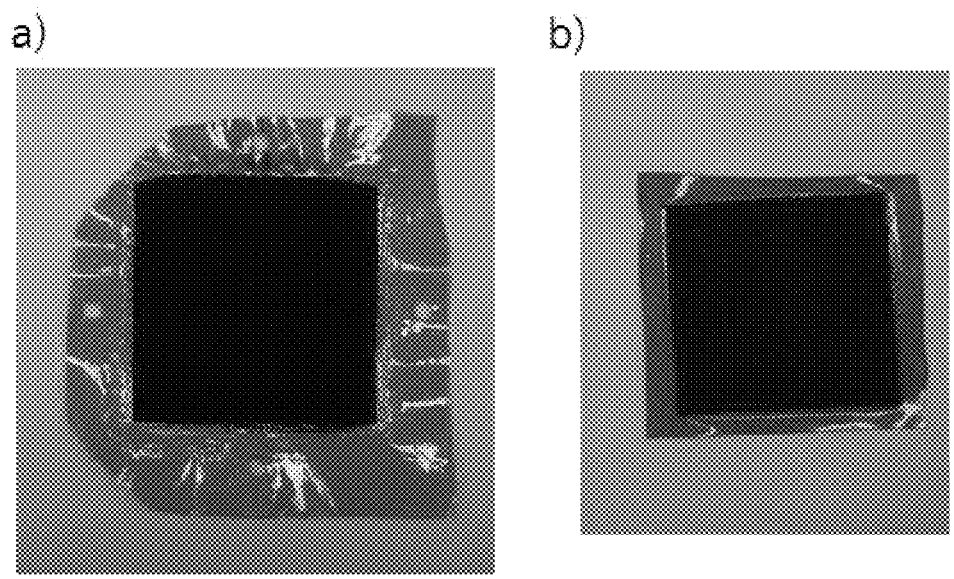
FIG. 6a is a photographic view showing the MEA using a sulfonate-containing PEM and further comprising a guard gasket after a fuel cell comprising the MEA is driven for a long time (as taken in the absence of gaskets)
FIG. 6b is a photographic view showing the MEA using a PBI-based PEM doped with 2,000% of phosphoric acid and further comprising a guard gasket after a fuel cell comprising the MEA is driven for a long time (as taken in the absence of gaskets).

FIG. 6a and FIG. 6b are photographic views showing the MEAs according to Example 1 and Example 2, respectively, after carrying out the above test (as taken in the absence of gaskets). As can be seen from FIGS. 6a and 6b, the electrolyte membranes cause no disruption at the edges thereof.

The invention has been described in detail with reference to example embodiments thereof. However, it will be appreciated by those skilled in the art that changes may be made in these embodiments without departing from the principles and spirit of the invention, the scope of which is defined in the accompanying claims and their equivalents.

What is claimed is:

1. A membrane-electrode assembly (MEA) comprising an electrolyte membrane (1), catalyst layers (2a, 2b) formed on both surfaces of the electrolyte membrane, gas diffusion layers (3a, 3b) formed on the catalyst layers, and gaskets (4a, 4b) that are in contact with the lateral surfaces of the catalyst layers and the gas diffusion layers; and further comprising a polytetrafluoroethylene (PTFE) guard gasket (5) interposed between the gaskets (4a, 4b) and having a thickness, which is smaller than that of the electrolyte membrane, corresponding to 75%-80% of the thickness of the electrolyte membrane.

2. The MEA as claimed in claim 1, wherein the electrolyte membrane is a polybenzimidazole (PBI)-based polymer electrolyte membrane (PEM) doped with 300% or more of inorganic acid.

3. The MEA as claimed in claim 1, wherein the electrolyte membrane is a sulfonate-containing electrolyte membrane with a humidity of 50% or higher.

4. A fuel cell comprising the MEA as defined in claim 1.

* * * * *